US008108688B2

(12) United States Patent
Nishimura

(10) Patent No.: US 8,108,688 B2
(45) Date of Patent: Jan. 31, 2012

(54) INFORMATION PROCESSING APPARATUS, METHOD, AND PROGRAM

(75) Inventor: Takuya Nishimura, Tokyo (JP)

(73) Assignee: Sony Corporation, Tokyo (JP)

( * ) Notice: Subject to any disclaimer, the term of this patent is extended or adjusted under 35 U.S.C. 154(b) by 1130 days.

(21) Appl. No.: 11/513,387

(22) Filed: Aug. 31, 2006

(65) Prior Publication Data

US 2007/0074020 A1 Mar. 29, 2007

(30) Foreign Application Priority Data

Sep. 6, 2005 (JP) ................................ 2005-257621

(51) Int. Cl.
*H04L 9/32* (2006.01)
*G06F 12/14* (2006.01)
*G06F 7/04* (2006.01)

(52) U.S. Cl. ........................... 713/189; 713/168; 726/27

(58) Field of Classification Search .................. 713/186, 713/168, 189; 726/27
See application file for complete search history.

(56) References Cited

U.S. PATENT DOCUMENTS

| 6,226,618 | B1 * | 5/2001 | Downs et al. .................... 705/51 |
| 6,519,648 | B1 * | 2/2003 | Eyal ............................... 709/231 |
| 7,103,574 | B1 * | 9/2006 | Peinado et al. .................. 705/51 |
| 2002/0077988 | A1 * | 6/2002 | Sasaki et al. ..................... 705/59 |
| 2002/0088010 | A1 * | 7/2002 | Dudkiewicz et al. ......... 725/138 |
| 2002/0138831 | A1 * | 9/2002 | Wachtfogel et al. ............ 725/32 |
| 2003/0158737 | A1 * | 8/2003 | Csicsatka ....................... 704/273 |
| 2004/0165724 | A1 * | 8/2004 | Choi et al. ....................... 380/45 |
| 2005/0234907 | A1 * | 10/2005 | Yamagishi et al. ............... 707/5 |
| 2006/0107325 | A1 * | 5/2006 | Kanestrom et al. ............. 726/26 |
| 2006/0272026 | A1 * | 11/2006 | Niwano et al. .................. 726/27 |
| 2008/0046499 | A1 * | 2/2008 | Cabrera et al. ................. 709/201 |

FOREIGN PATENT DOCUMENTS

| EP | 1 515 335 A1 | 3/2005 |
| JP | 9-247105 | 9/1997 |
| JP | 2004-355069 | 12/2004 |
| JP | 2005-18269 | 1/2005 |
| JP | 2005-26850 | 1/2005 |
| JP | 2005-167987 | 6/2005 |
| JP | 2005275503 A * | 10/2005 |
| WO | WO 02/08945 A1 | 1/2002 |
| WO | WO 02/071021 A1 | 9/2002 |

OTHER PUBLICATIONS

Lee, Junseok et al. "A DRM Framework for Distributing Digital Contents through the Internet", Dec. 2003.*
Jacob, Max. "RDF in the Semantic Hifi European project", 2004.*

(Continued)

*Primary Examiner* — Michael Simitoski
(74) *Attorney, Agent, or Firm* — Oblon, Spivak, McClelland, Maier & Neustadt, L.L.P.

(57) ABSTRACT

Disclosed herein is an information processing apparatus that processes content data supplied in a format that has at least a metadata region in which metadata of a content is stored, the apparatus including: acquisition means configured to acquire the content data in the aforementioned format and decryption information for decrypting the metadata that is encrypted, the content data containing the encrypted metadata stored in the metadata region; decryption means configured to decrypt the encrypted metadata stored in the metadata region using the decryption information; and supplementary service providing means configured to provide a supplementary service related to the content based on the metadata decrypted by the decryption means.

14 Claims, 13 Drawing Sheets

OTHER PUBLICATIONS

Alvira, Mariano et al. "The Audiomomma Music Recommendation System", Jul. 2001.*

Egidi, Lavinia et al. "Bringing Multimedia Contents into MP3 Files", May 2005.*

Logan, Beth et al. "Semantic Analysis of Song Lyrics", Apr. 2004.*

Lavinia Egidi, et al., "Bringing Multimedia Contents into MP3 Files", IEEE Communications Magazine, XP-001229786, May 2005, pp. 90-97.

Office Action issued Apr. 26, 2011 in Japan Application No. 2005-257621.

* cited by examiner

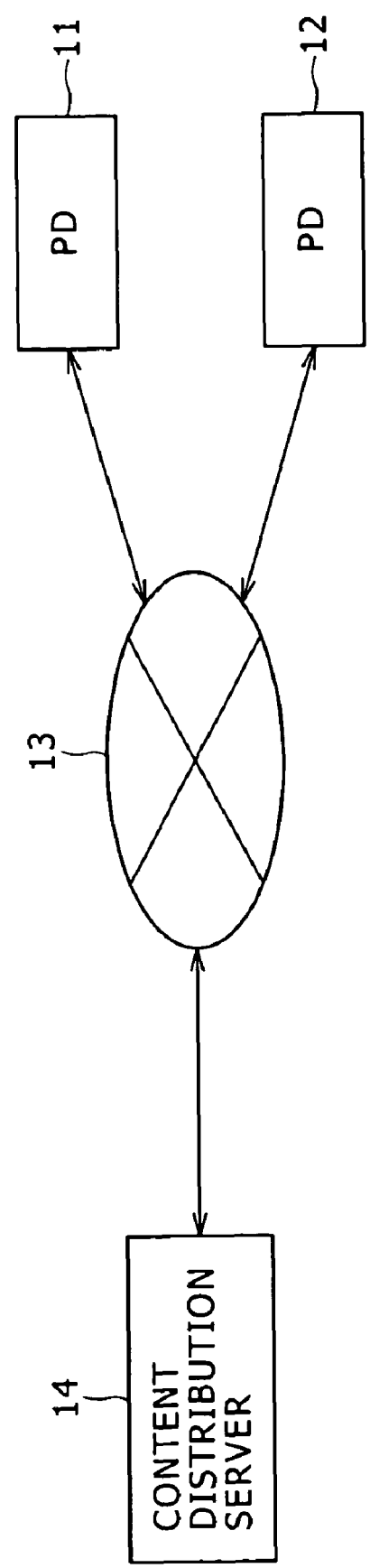

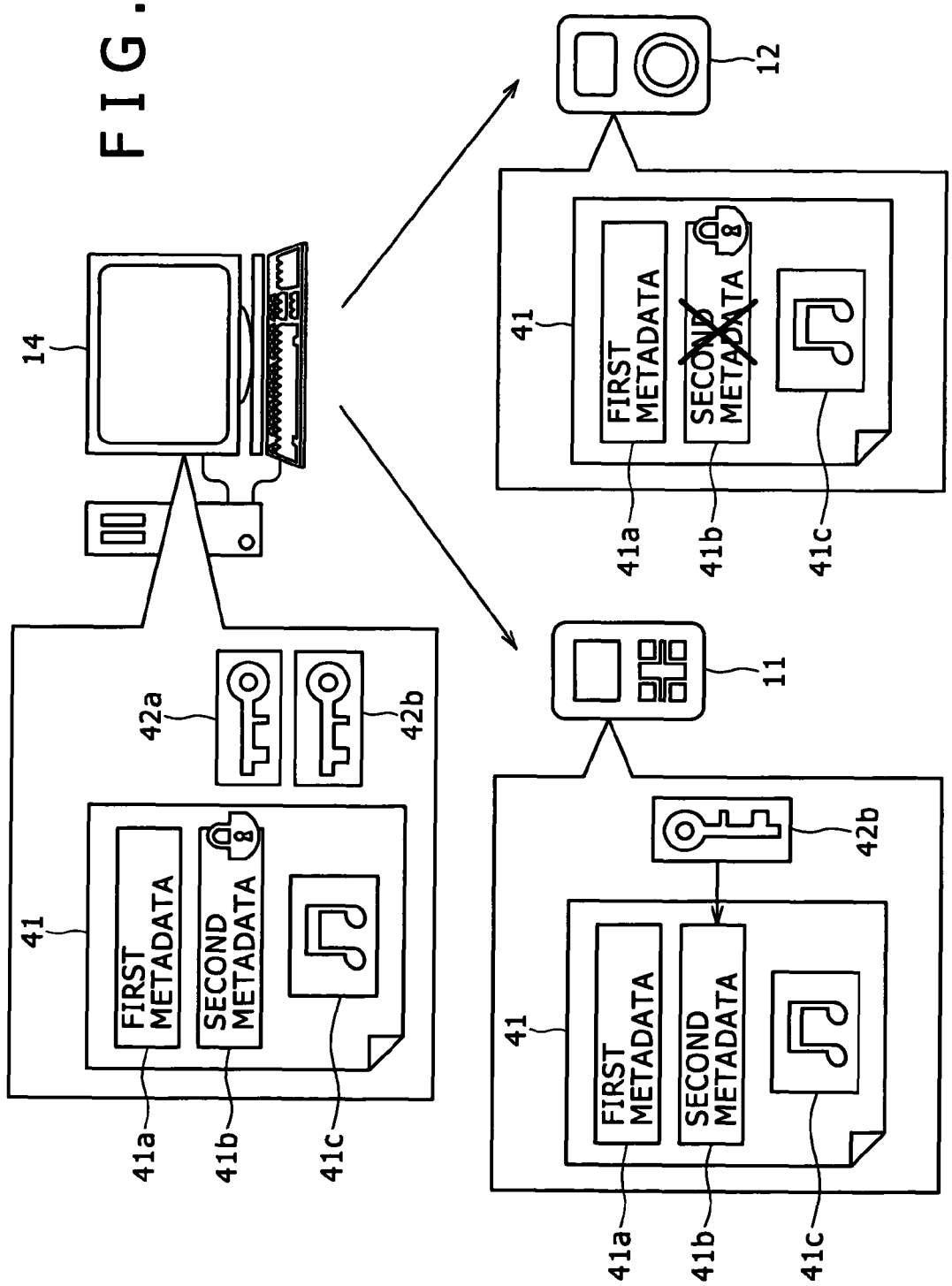

FIG.8

| FRAME ID | FRAME CONTENT |
|---|---|
| TIT2 | TITLE |
| TPE1 | ARTIST NAME |
| TPE2 | BAND/ORCHESTRA/ACCOMPANIST |
| TCOM | COMPOSER |
| TEXT | LYRICIST/DOCUMENT CREATOR |
| TPUB | PUBLISHER |
| TCOP | COPYRIGHT |
| TDRL | RELEASE TIME |
| TLAN | LANGUAGE |
| TLEN | LENGTH |
| ⋮ | ⋮ |

FIG.10

```
1   ## CLASS DEFINITION
2   mc:music         a rdfs:Class.              # DEFINITION OF MUSIC CLASS
3   mc:genreOf a rdfs:Property;                  # PROPERTY INDICATING GENRE
4              rdfs:domain    mc:music;          # BELONGS TO MUSIC CLASS
5              rdfs:type      gc:genre.          # HAS INSTANCE OF GENRE CLASS
6
7   gc:genre   a  rdfs:Class.                    # DEFINITION OF GENRE CLASS
8   gc:jazz         rdfs:subClassOf   gc:genre.  # JAZZ CLASS BELONGS TO GENRE CLASS
9   gc:latin        rdfs:subClassOf   gc:genre.  # LATIN CLASS BELONGS TO GENRE CLASS
10  gc:modernJazz   rdfs:subClassOf   gc:jazz.   # MODERN JAZZ CLASS BELONGS TO JAZZ CLASS
11  gc:bossaNova    rdfs:subClassOf   gc:jazz;   # BOSSANOVA CLASS BELONGS TO JAZZ CLASS
12                  rdfs:subClassOf   gc:latin.  # ALSO BELONGS TO LATIN CLASS
13
14  ## GENRE INSTANCE DEFINITION
15  gi:Jazz         a    gc:jazz.                # JAZZ GENRE
16  gi:ModernJazz   a    gc:modernJazz.          # MODERN JAZZ GENRE
17  gi:BossaNova    a    gc:bossaNova.           # BOSSA NOVA GENRE
```

F I G . 1 1
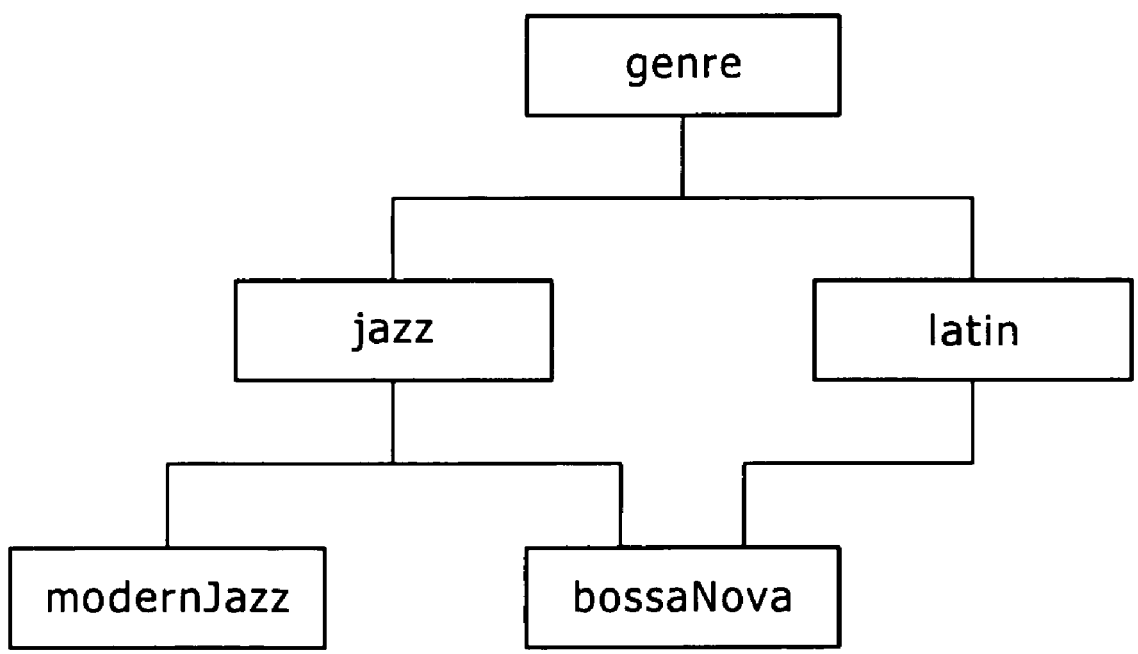

F I G . 1 2

```
1   ## MUSIC INSTANCE DEFINITION
2   :AAAXXX  a m:music;  m:genreOf  gi:Jazz.        # "AAAXXX" (JAZZ)
3   :BBBYYY  a m:music;  m:genreOf  gi:BossaNova.   # "BBBYYY" (BOSSA NOVA)
4   :CCCZZZ  a m:music;  m:genreOf  gi:ModernJazz.  # "CCCZZZ" (MODERN JAZZ)
```

INFORMATION PROCESSING APPARATUS, METHOD, AND PROGRAM

CROSS REFERENCES TO RELATED APPLICATIONS

The present invention contains subject matter related to Japanese Patent Application JP 2005-257621, filed in the Japanese Patent Office on Sep. 6, 2005, the entire contents of which being incorporated herein by reference.

BACKGROUND OF THE INVENTION

1. Field of the Invention

The present invention relates to an information processing apparatus, method, and program, and particularly to an information processing apparatus, method, and program for providing a supplementary service using content data supplied.

2. Description of the Related Art

In recent years, apparatuses (recording/reproducing apparatuses) that are capable of recording (storing) contents, such as music (musical pieces), films, etc., in the form of digital signals and reproducing them have been spreading rapidly. Examples of such apparatuses include personal computers, hard disk recorders, digital versatile disc (DVD) recorders, and portable devices such as portable digital audio players that contain a small-sized hard disk or a semiconductor memory as a storage medium.

Since there is a tendency for the storage capacity of a storage medium contained in such an apparatus to increase, ease in retrieving a desired content from a great amount of contents stored within the apparatus has been becoming more and more important. As such, as described in Japanese Patent Laid-Open No. 2004-355069, for example, there is an apparatus that reproduces a content and is capable of recommending to a user an optimum content out of a great amount of contents as a supplementary service related to the content.

SUMMARY OF THE INVENTION

As shown above, there is a demand for an apparatus that reproduces a content or the like to be equipped with a mechanism for providing a supplementary service related to a content reproduced, instead of simply reproducing the content.

There being such a situation, an advantage of the present invention is to provide an information processing apparatus, method, and program which are capable of providing a supplementary service using content data supplied.

An information processing apparatus according to an embodiment of the present invention is an information processing apparatus that processes content data supplied in a format that has at least a metadata region in which metadata of a content is stored. The information processing apparatus includes: acquisition means configured to acquire the content data in the aforementioned format and decryption information for decrypting the metadata that is encrypted, the content data containing the encrypted metadata stored in the metadata region; decryption means configured to decrypt the encrypted metadata stored in the metadata region using the decryption information; and supplementary service providing means configured to provide a supplementary service related to the content based on the metadata decrypted by the decryption means.

The information processing apparatus may further include authentication means configured to perform an authentication process in connection with a server that supplies the content data, and the acquisition means may acquire the decryption information by receiving the decryption information from the server after the authentication process is completed.

The decrypted metadata may be data representing a genre of the content or data expressing an impression of the content, and the supplementary service provided by the supplementary service providing means may be recommending, to a user who likes the content, another optimum content.

The aforementioned format may be a MP3 (MPEG (Moving Picture Experts Group)-1 Audio Layer-3), and the metadata region may be an extended tag or a frame within an ID3 tag.

The metadata may be written in a language that has adopted a description logic.

The aforementioned language may be an ontology language OWL.

The content may be audio data or video data, and the information processing apparatus may be a reproducing apparatus that reproduces the content.

An information processing method and program according to another embodiment of the present invention is, respectively, an information processing method employed by an information processing apparatus that processes content data supplied in a format that has at least a metadata region in which metadata of a content is stored, and a program that causes a computer to process the content data. The information processing method and the process that the program causes the computer to execute include the steps of: acquiring the content data in the aforementioned format and decryption information for decrypting the metadata that is encrypted, the content data containing the encrypted metadata stored in the metadata region; decrypting the encrypted metadata stored in the metadata region using the decryption information; and providing a supplementary service related to the content based on the metadata decrypted.

According to yet another embodiment of the present invention, in a process for content data supplied in a format that has at least a metadata region in which metadata of a content is stored: the content data in the aforementioned format and decryption information for decrypting the metadata that is encrypted are acquired, the content data containing the encrypted metadata stored in the metadata region; the encrypted metadata stored in the metadata region is decrypted using the decryption information; and a supplementary service related to the content is provided based on the metadata decrypted.

According to yet another embodiment of the present invention, it is possible to provide a supplementary service using content data supplied.

BRIEF DESCRIPTION OF THE DRAWINGS

FIG. 1 is a block diagram illustrating an exemplary configuration of a content distribution system according to one embodiment of the present invention;

FIG. 2 is a diagram illustrating a difference between functions that can be performed by a PD 11 and a PD 12;

FIG. 8 is a diagram for explaining the format of the ID3 tag;

FIG. 10 is a diagram for explaining a second content recommendation process;

FIG. 11 is a diagram for explaining the second content recommendation process;

FIG. 12 is a diagram for explaining the second content recommendation process;

DETAILED DESCRIPTION OF THE PREFERRED EMBODIMENTS

Figure 3:
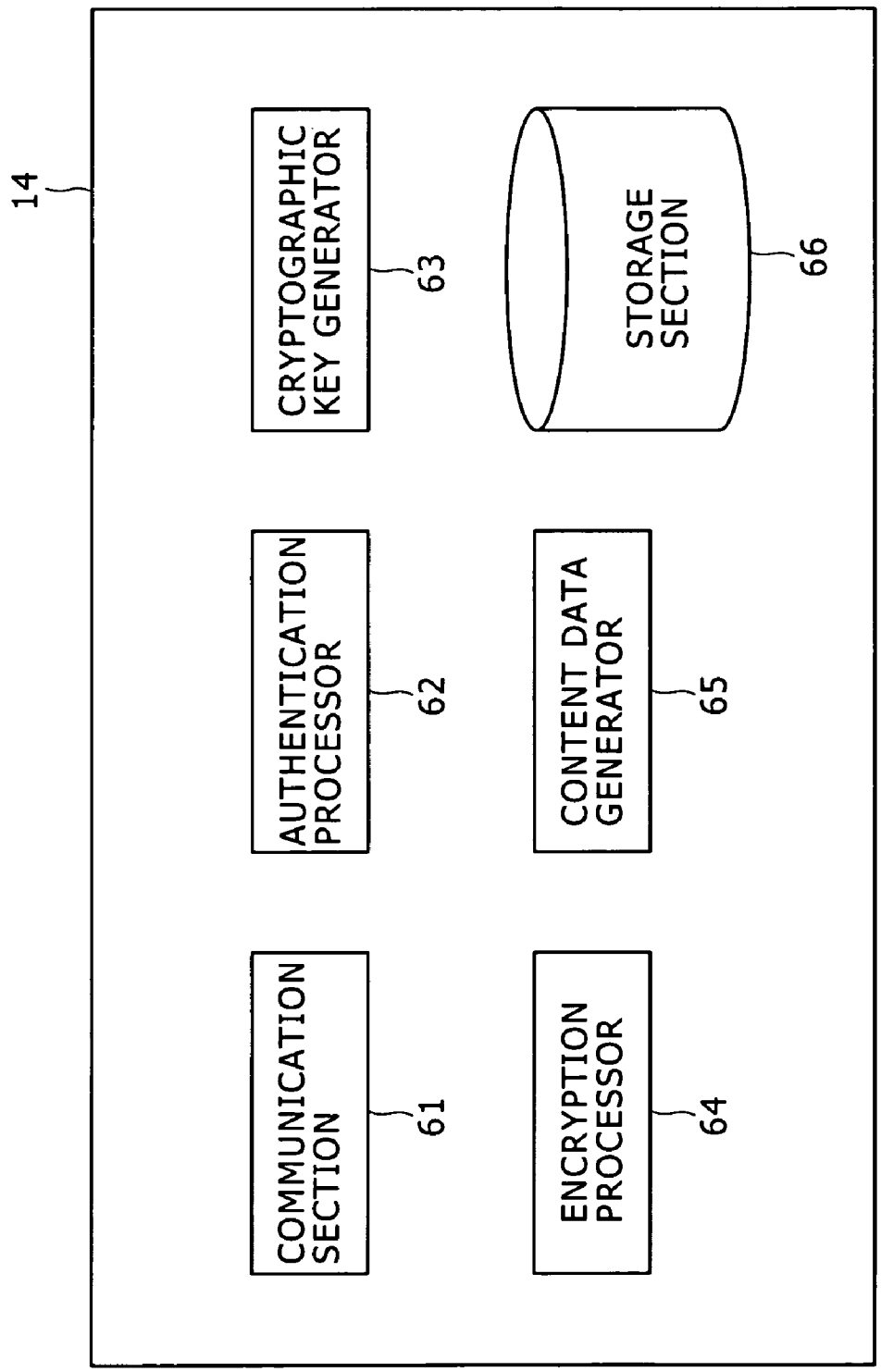
FIG. 3 is a block diagram illustrating an exemplary functional structure of a content distribution server 14.

Hereinafter, embodiments of the present invention will be described. Correspondence between the constituent features of the present invention and the embodiments that will be described in a detailed description of the present invention below is exemplified as follows. Note that this preliminary description is meant to confirm that embodiments that support the present invention are described in the detailed description of the present invention. Therefore, even if there is an embodiment that is described in the detailed description of the present invention but not described in this preliminary description as corresponding to a constituent feature of the present invention, that does not mean that that embodiment does not correspond to that constituent feature. Conversely, even if an embodiment is described in this preliminary description as corresponding to a constituent feature, that does not mean that that embodiment does not correspond to any other constituent feature.

An information processing apparatus according to a embodiment of the present invention is an information processing apparatus (e.g., a PD 11 in FIG. 4) that processes content data supplied in a format that has at least a metadata region in which metadata of a content is stored. The information processing apparatus includes: acquisition means (e.g., a communication section 71 in FIG. 4) configured to acquire the content data in the aforementioned format and decryption information for decrypting the metadata that is encrypted, the content data containing the encrypted metadata stored in the metadata region; decryption means (e.g., a decryption processor 74 in FIG. 4) configured to decrypt the encrypted metadata stored in the metadata region using the decryption information; and supplementary service providing means (e.g., a content-related process section 75 in FIG. 4) configured to provide a supplementary service related to the content based on the metadata decrypted by the decryption means.

An information processing method and program according to another embodiment of the present invention is, respectively, an information processing method employed by an information processing apparatus that processes content data supplied in a format that has at least a metadata region in which metadata of a content is stored, and a program that causes a computer to process the content data. The information processing method and the process that the program causes the computer to execute include the steps of: acquiring the content data in the aforementioned format and decryption information for decrypting the metadata that is encrypted, the content data containing the encrypted metadata stored in the metadata region (e.g., step S33 in FIG. 14); decrypting the encrypted metadata stored in the metadata region using the decryption information (e.g., step S52 in FIG. 16); and providing a supplementary service related to the content based on the metadata decrypted (e.g., step S53 in FIG. 16)).

Hereinafter, embodiments of the present invention will be described with reference to the accompanying drawings.

FIG. 1 illustrates an exemplary configuration of a content distribution system to which the present invention is applied.

In the content distribution system illustrated in FIG. 1, portable devices (PDs) 11 and 12 are connected to a content distribution server 14 via a network 13 such as the Internet, a local area network (LAN), or the like.

The PDs 11 and 12 are constituted by, for example, a mobile phone, a personal digital assistant (PDA), a digital camera, a portable digital audio player including a flash memory, a hard disk, or the like. The PDs 11 and 12 are reproducing apparatuses (information processing apparatuses) that acquire content data transmitted from the content distribution server 14 and reproduce the content data.

Note that the PDs 11 and 12 may directly communicate with the content distribution server 14 via the network 13 to acquire the content data therefrom as illustrated in FIG. 1, or alternatively may be connected to a personal computer or the like and acquire, from the personal computer, the content data that the personal computer has downloaded from the content distribution server 14.

The content distribution server 14 checks authenticity of a terminal (the PD 11, the PD 12, or the like) that seeks access to the content distribution server 14 and, if the terminal is authenticated, provides (i.e., transmits) the content data to the terminal.

Note that, in the present embodiment, musical piece (music) data (i.e., an audio file) in MP3 (MPEG (Moving Picture Experts Group)-1 Audio Layer-3) format is transferred as the content data between the content distribution server 14 and the PDs 11 and 12.

The same content data is provided to both the PD 11 and the PD 12, but functions that can be carried out based on the provided content data are different between the PD 11 and the PD 12.

With reference to FIG. 2, a difference between functions that can be carried out by the PD 11 and the PD 12 will now be described below.

As illustrated in FIG. 2, the content distribution server 14 possesses (i.e., stores) content data 41 corresponding to one musical piece "XXX" (i.e., a content) as content data to be provided to a terminal that has accessed the content distribution server 14. Note that "XXX" is a provisional title of the musical piece.

As described above, the content data 41 is a MP3 file and includes at least a first metadata 41a, a second metadata 41b, and actual data 41c (audio data) of the musical piece "XXX."

The first metadata 41a is, for example, a title ("XXX"), an artist name, a playing time, etc., of the musical piece. The second metadata 41b is information (e.g., a genre of the musical piece) for a supplementary service, which will be described later.

The second metadata 41b is encrypted using an encryption key 42a, and the content distribution server 14 holds therein the encryption key 42a used to encrypt the second metadata 41b and a corresponding decryption key 42b in addition to the content data 41.

A user who possesses (uses) the PD 11 is a subscriber to the supplementary service provided by the content distribution server 14 (hereinafter referred to as a "supplementary service member" as necessary), and has paid a prescribed supplementary service fee (i.e., a registration fee) to an agency that manages the content distribution server 14 (hereinafter referred to as a "content distributor").

If the PD 11 accesses the content distribution server 14 and requests download of the content data 41, the content distribution server 14 performs an authentication process and recognizes that the user of the PD 11 is a supplementary service member. Then, the content distribution server 14 transmits (i.e., provides) the requested content data 41 and the decryption key 42b to the PD 11.

The PD 11 receives the content data 41 and the decryption key 42b transmitted from the content distribution server 14 and stores them inside. Then, if an operation for reproducing the musical piece "XXX" is performed in the PD 11, the PD 11 reproduces the actual data 41c of the musical piece "XXX." At this time, the first metadata 41a that represents the title, artist name, etc., of the musical piece is read, and such information is displayed on a display unit of the PD 11. The first metadata 41a is also used when displaying a list of contents held within the PD 11, for example.

In addition, the PD 11 decrypts the encrypted second metadata 41b using the decryption key 42b provided from the content distribution server 14 along with the content data 41. Then, the PD 11 becomes able to carry out the supplementary service using the decrypted second metadata 41b.

Assume herein that the supplementary service provided by the content distribution server 14 is a service (a function) of recommending another optimum content to the user, who may like the reproduced content, for example. In this case, after reproducing the actual data 41c of the content data 41 downloaded from the content distribution server 14, the PD 11 is able to present (i.e., recommend) to the user another content that the user, who may like the reproduced musical piece "XXX," is expected to like.

On the other hand, a user who possesses the PD 12 is not a supplementary service member and therefore has not paid the supplementary service fee.

If the PD 12 accesses the content distribution server 14 and requests download of the content data 41, the content distribution server 14 performs the authentication process and transmits (provides) only the requested content data 41 to the PD 12.

The PD 12 receives the content data 41 transmitted from the content distribution server 14 and stores it inside. Then, if an operation for reproducing the musical piece "XXX" is performed, the PD 12 reproduces the actual data 41c of the musical piece "XXX." In this case, as is also the case with the PD 11, the first metadata 41a, which has not been encrypted, is read and displayed on a display unit thereof. However, since the PD 12 has not acquired the decryption key 42b for decrypting the encrypted second metadata 41b, the PD 12 is not able to decrypt the encrypted second metadata 41b. Therefore, the user who possesses the PD 12 is not be able to enjoy the supplementary service.

As described above, although the PD 11 and the PD 12 receive the same content data 41, the PD 11 is able to carry out (provide) the service using the second metadata 41b while the PD 12 is not able to carry out the service using the second metadata 41b. In other words, the user of the PD 11 is able to enjoy the supplementary service while the user of the PD 12 is not be able to enjoy the supplementary service.

FIG. 3 is a block diagram illustrating an exemplary functional structure of the content distribution server 14.

The content distribution server 14 includes a communication section 61, an authentication processor 62, a cryptographic key generator 63, an encryption processor 64, a content data generator 65, and a storage section 66.

The communication section 61 exchanges a command, the content data, etc., with the PD 11 or the PD 12 in accordance with a predetermined protocol via the network 13. The authentication processor 62 performs the authentication process using, e.g., a challenge response system in connection with a terminal (the PD 11, the PD 12, or the like) that seeks connection via the communication section 61. The authentication processor 62 checks whether a user of the terminal that seeks connection is a registered user or not, whether he or she is a supplementary service member or not, and the like. Note that the authentication process is also performed in connection with a terminal of a user who is not a supplementary service member just like the user of the PD 12, in order to manage licenses for the content.

The cryptographic key generator 63 generates a pair of an encryption key and a decryption key necessary for a cryptographic process, and allows the storage. section 66 to store the pair of keys. For example, the cryptographic key generator 63 generates the encryption key 42a and the decryption key 42b for the PD 11.

The encryption processor 64 performs a process (i.e., an encryption process) of encrypting a predetermined data using the encryption key. For example, the encryption processor 64 encrypts the second metadata 41b using the encryption key 42a for the PD 11.

The content data generator 65 generates, in the form of a MP3 file, content data of a content for which a request has been issued from the terminal that has accessed the content distribution server 14. For example, in the case where a request for download of the musical piece "XXX" has been issued from the PD 11, the content data generator 65 acquires from the storage section 66 the first metadata 41a, the second metadata 41b, and the actual data 41c of the musical piece "XXX" to generate the content data 41 (see FIG. 2).

The storage section 66 stores the actual data of the content to be provided (transmitted) to a terminal that accesses the content distribution server 14, the metadata (the first and second metadata) thereof, etc. The storage section 66 also stores the pair of the encryption key and the decryption key used for the encryption and decryption of the second metadata of the content.

The content distribution server 14 having the above structure performs the authentication process in connection with the terminal, such as the PD 11, the PD 12, or the like, that seeks access thereto, and thereafter generates the content data of the content for which a request has been issued from the terminal in the form of a MP3 file and transmits it to the terminal.

Figure 4:
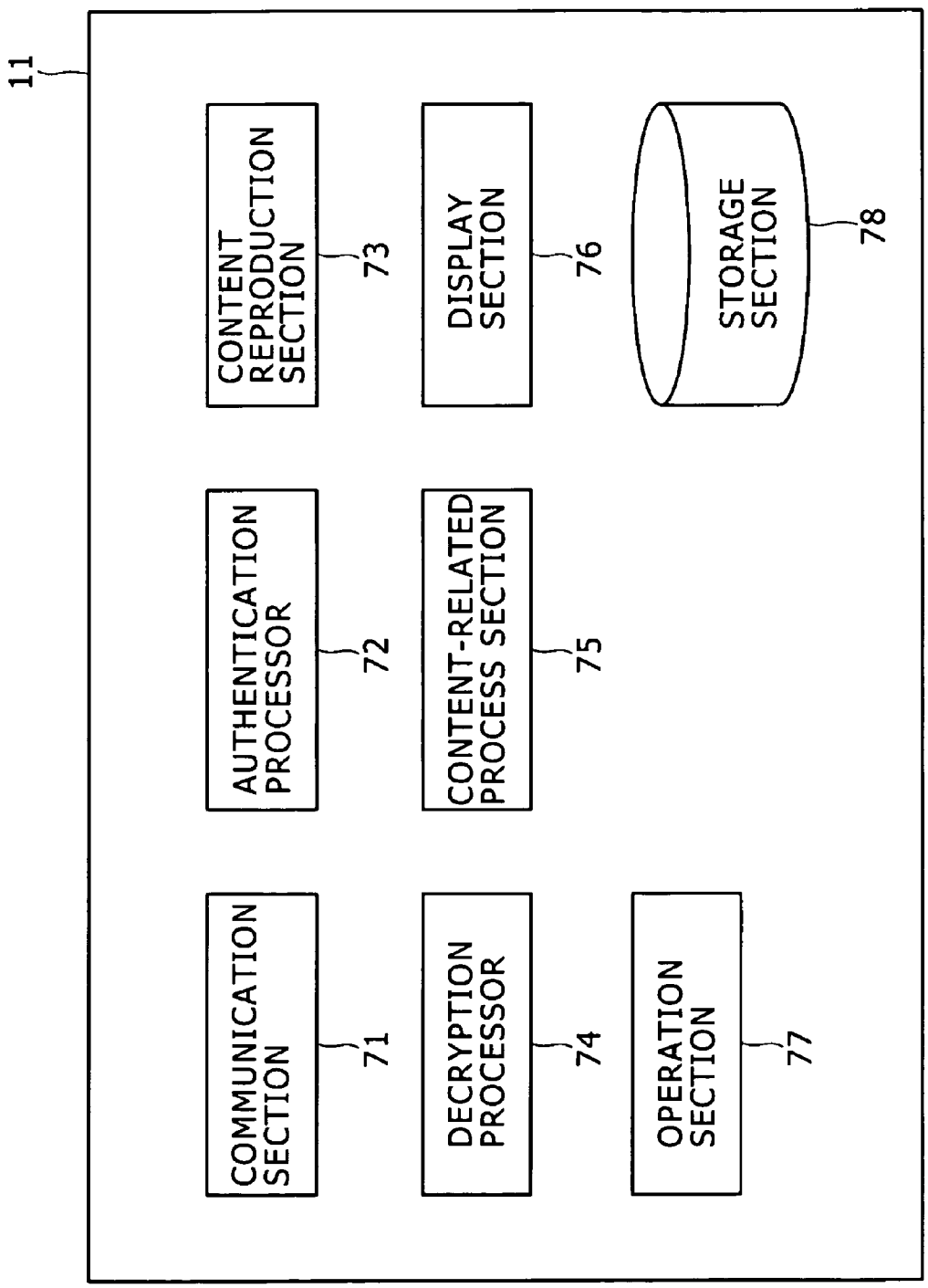
FIG. 4 is a block diagram illustrating an exemplary functional structure of a PD 11.

FIG. 4 is a block diagram illustrating an exemplary functional structure of the PD 11.

The PD 11 includes a communication section 71, an authentication processor 72, a content reproduction section 73, a decryption processor 74, a content-related process section 75, a display section 76, an operation section 77, and a storage section 78.

The communication section 71 exchanges a command, the content data, etc., with the content distribution server 14 in accordance with a predetermined protocol via the network 13. The authentication processor 72 performs the authentication process using, e.g., the challenge response system in connection with the content distribution server 14 with which the PD 11 has been connected via the communication section 71.

In accordance with a content reproduction signal supplied from the operation section 77, the content reproduction section 73 acquires the actual data (the audio data) of a specified content from the storage section 78 and reproduces the actual data. The reproduced content (i.e., the musical piece) is outputted via a loudspeaker, headphones, or the like (not shown). The content reproduction section 73 also reads the first metadata of the content being reproduced, and allows the display section 76 to display it. As a result, the title, artist name, etc., of the content being reproduced are displayed on the display section 76.

The decryption processor 74 performs a decryption process of decrypting encrypted data. For example, the decryption processor 74 decrypts the encrypted second metadata 41*b* of the content data 41 using the decryption key 42*b*.

If a content-related processing execution signal is supplied from the operation section 77, the content-related process section 75 executes a process related to the content (e.g., a content recommendation process) based on the decrypted second metadata, thereby providing the supplementary service to the user. The display section 76 allows data supplied from the content reproduction section 73, the content-related process section 75, the operation section 77, etc., to be displayed on a display such as a liquid crystal display (LCD).

The operation section 77, which includes, e.g., a button, a touch panel, or the like, accepts a user operation and supplies a signal to a relevant part in response to the operation. For example, if the user issues an instruction to reproduce a content stored in the storage section 78, the operation section 77 supplies, to the content reproduction section 73, the content reproduction signal specifying that content. The operation section 77 also supplies the content-related processing execution signal to the content-related process section 75 to allow the content recommendation process to be executed.

The storage section 78 stores the content data and the decryption key for decrypting the encrypted second metadata within the content data, which the PD 11 has downloaded from the content distribution server 14.

The PD 11 having the above structure stores the content data downloaded from the content distribution server 14 in the storage section 78, and reproduces the content in response to the user operation. The PD 11 also executes the content recommendation process of recommending, to the user, who may like the specified content (i.e., the content being reproduced), another optimum content.

Meanwhile, the PD 12 has the same structure as that of the PD 11 except that the PD 12 does not hold the decryption key 42*b* for decrypting the encrypted second metadata within the content data because the user who possesses the PD 12 is not a supplementary service member. Therefore, if the user who possesses the PD 12 becomes a supplementary service member, he or she will be able to enjoy the supplementary service as the user of the PD 11 is.

Figure 5:
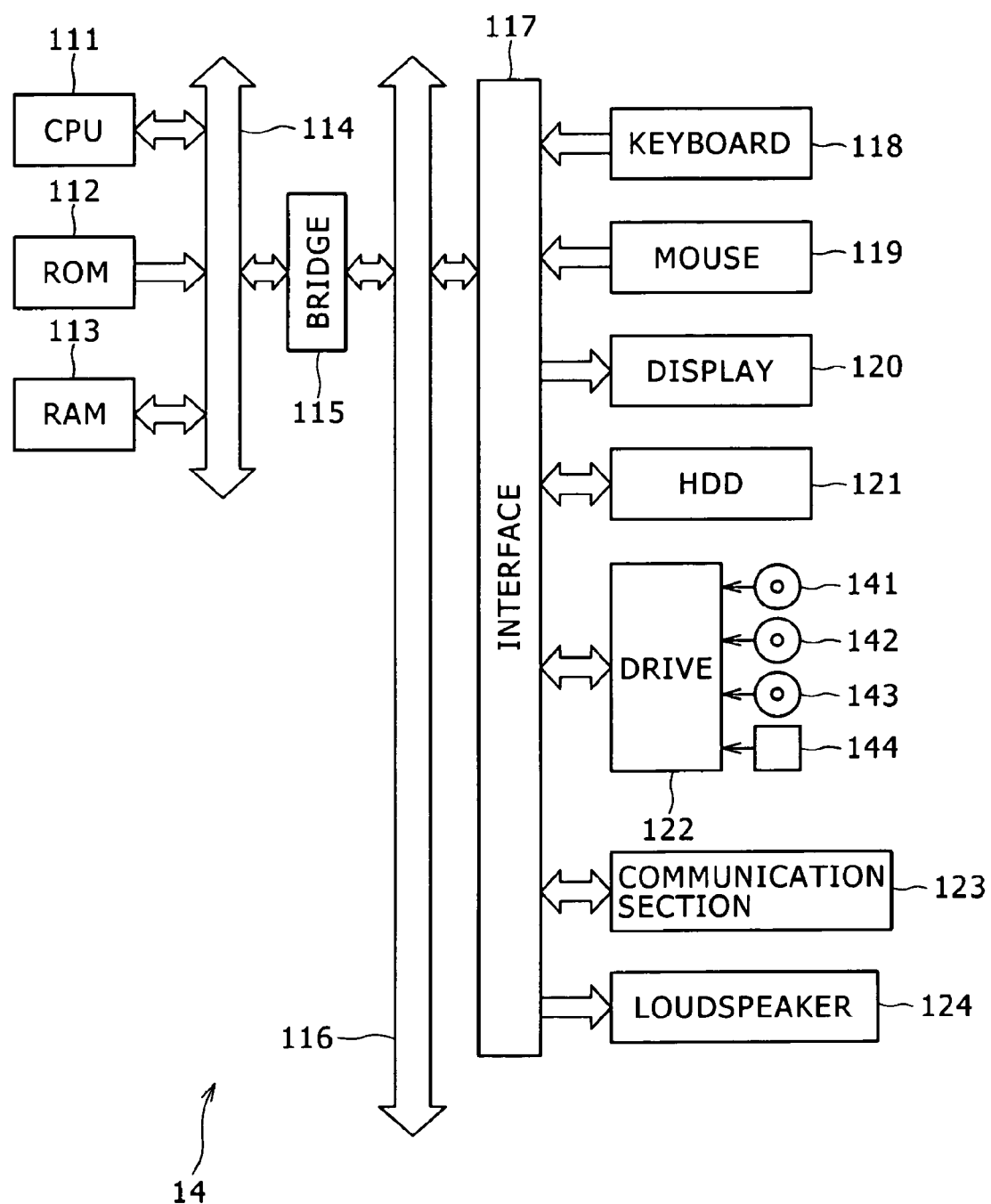
FIG. 5 is a block diagram illustrating an exemplary hardware configuration of the content distribution server 14.

FIG. 5 is a block diagram illustrating an exemplary hardware configuration of the content distribution server 14.

A central processing unit (CPU) 111 executes various application programs and an operating system (OS). A read-only memory (ROM) 112 generally stores basically fixed data out of programs and parameters for computation used by the CPU 111. A random-access memory (RAM) 113 stores a program used in operation of the CPU 111 and parameters that change as necessary in the operation thereof. They are interconnected via a host bus 114 formed by a CPU bus or the like.

The host bus 114 is connected to an external bus 116, such as a peripheral component interconnect/interface (PCI) bus or the like, via a bridge 115.

A keyboard 118 is operated by the user when inputting various instructions to the CPU 111. A mouse 119 is operated by the user when specifying or selecting a point on a screen of a display 120. The display 120 is formed by a liquid crystal display, a cathode ray tube (CRT), or the like, and displays various information in the form of text or an image. A hard disk drive (HDD) 121 drives a hard disk to record or reproduce information or a program executed by the CPU 111.

A drive 122 reads data or a program recorded on a magnetic disk 141, an optical disk 142, a magneto-optical disk 143, or a semiconductor memory 144 mounted thereon, and supplies the data or the program to the RAM 113 or the HDD 121.

A communication section 123 stores data supplied from the CPU 111 or the HDD 121 (e.g., the decryption key, the content data, etc.) in a packet in a predetermined format and transmits it to the PD 11 (or the PD 12) via the network 13 and, in addition, outputs data (e.g., a request for registration, a request for transmission of a content, etc.) stored in a packet received from the PD 11 (or the PD 12) via the network 13 to the CPU 111, the RAM 113, or the HDD 121.

A loudspeaker 124 outputs a predetermined sound based on data (an audio signal) supplied from an interface 117.

The keyboard 118, the mouse 119, the display 120, the HDD 121, the drive 122, the communication section 123, and the loudspeaker 124 are connected to the interface 117, and the interface 117 is connected to the CPU 111 via the external bus 116, the bridge 115, and the host bus 114.

Figure 6:
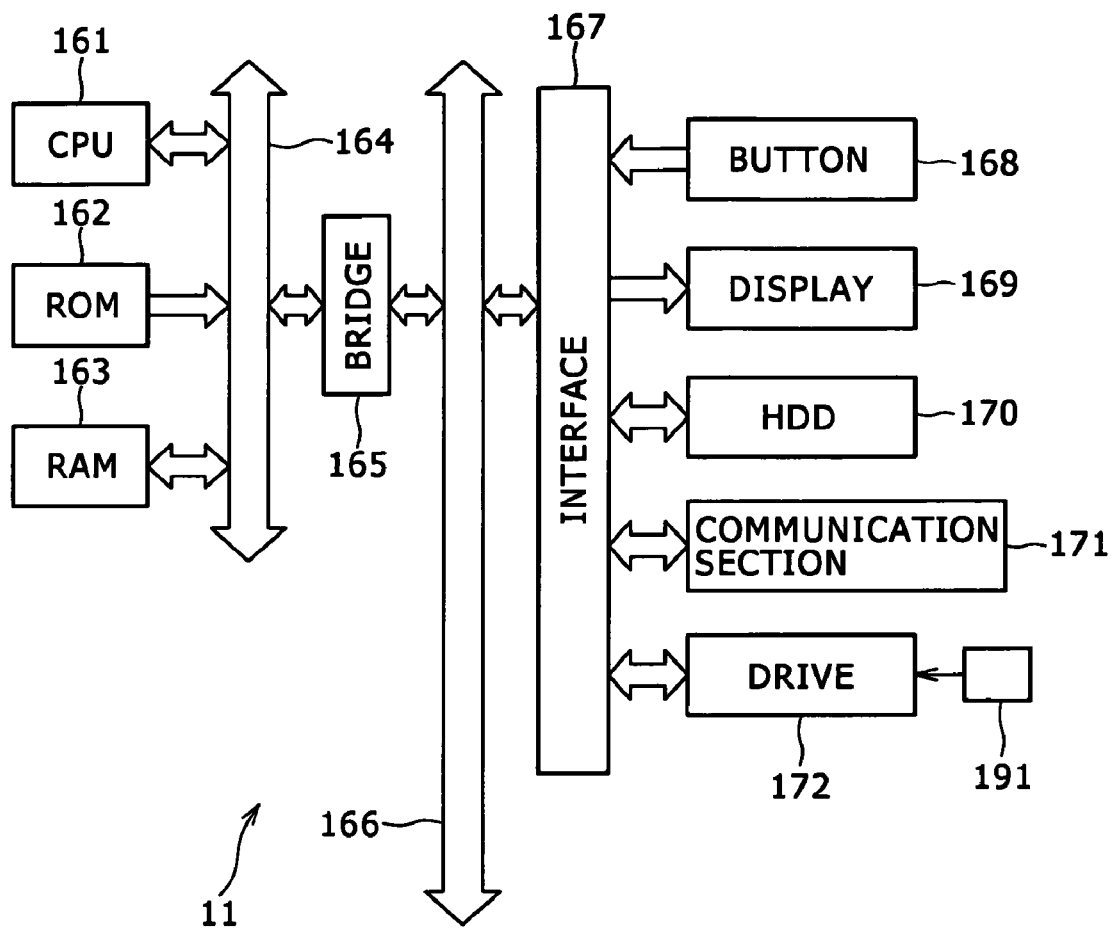
FIG. 6 is a block diagram illustrating an exemplary hardware configuration of the PD 11.

FIG. 6 is a block diagram illustrating an exemplary hardware configuration of the PD 11 that includes a hard disk as a storage medium in which the content data is to be stored.

A CPU 161 performs various processes such as the authentication process in connection with the content distribution server 14, the process of decrypting the encrypted second metadata, etc. A ROM 162 generally stores basically fixed data out of programs and parameters for computation used by the CPU 161. A RAM 163 stores a program used in operation of the CPU 161 and parameters that change as necessary in the operation thereof. They are interconnected via a host bus 164 formed by a CPU bus or the like.

The host bus 164 is connected to an external bus 166 via a bridge 165.

A button 168 is operated by the user when inputting various instructions to the CPU 161. A display 169 is formed by a LCD or the like and displays various information in the form of text (characters) or an image (a graphic). A HDD 170 stores the content data supplied from the content distribution server 14, the decryption key 42*b* required to decrypt the encrypted second metadata, and the like. A communication section 171 is connected to the content distribution server 14 and exchanges predetermined data (a content, a command, etc.) with the content distribution server 14.

A drive 172 reads data or a program stored in a semiconductor memory 191 mounted thereon and supplies the data or the program to the RAM 163 or the HDD 170. The storage medium mounted on the drive 172 is not limited to the semiconductor memory 191 but may be a magnetic disk, an optical disk, a magneto-optical disk, or the like.

The button 168, the display 169, the HDD 170, the communication section 171, and the drive 172 are connected to an interface 167, and the interface 167 is connected to the CPU 161 via the external bus 166, the bridge 165, and the host bus 164.

Note that, instead of the hard disk, the PD 11 may include a flash memory or the like as a storage medium in which the content data and the like are to be stored.

The content data 41 is supplied to the PD 11 in the form of a MP3 file, and the MP3 file has added thereto a region called an ID3 tag in which character information (i.e., text data) is stored. The first metadata 41*a* and the second metadata 41*b* of the content data 41 as illustrated in FIG. 2 are stored in this ID3 tag.

Here, a format of the ID3 tag (an ID3v2 tag) will now be described with reference to FIGS. 7 and 8.

Figure 7:
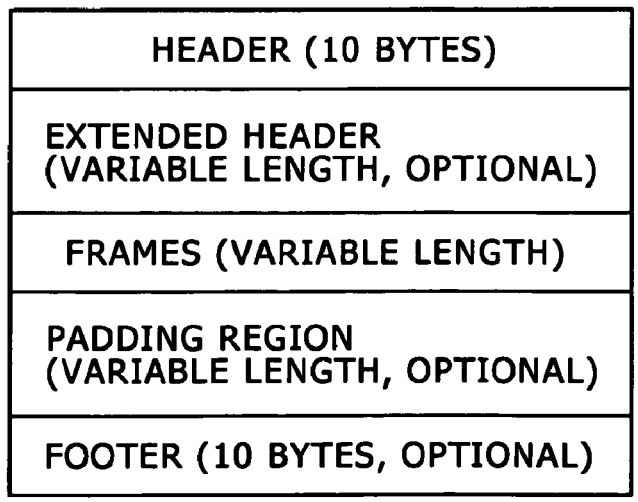
FIG. 7 is a diagram for explaining a format of an ID3 tag.

As illustrated in FIG. 7, the ID3 tag is composed of a header, an extended header, frames, a padding region, and a footer, which are arranged in this order with the header at the head of the file. Note that the extended header, the padding region, and the footer may be omitted.

In the header, an identifier for identifying the ID3 tag, a version of the ID3 tag, a flag that indicates, e.g., whether the extended header is present or not, and information concerning the size of the ID3 tag (a tag length) are stored. The header is 10 bytes long.

Detailed information concerning the structure of the tag can be stored in the extended header, and the size of the extended header is variable depending on the information stored therein.

The above-described first metadata 41a and second metadata 41b can be stored in the frames, and the size of the frames is variable depending on the information stored therein. That is, the information of the title and artist name of the musical piece, etc. is stored in the frames. The frames are prepared separately for each type of the information stored. Therefore, a plurality of frames is arranged, such as a frame in which the title of the musical piece is stored, a frame in which the artist name thereof is stored, and so on.

In more detail, each frame is composed of a frame header and a field. In the frame header, a frame ID that indicates information (e.g. the first metadata 41a, the second metadata 41b, or the like) stored in the field, the size of the frame, and the like are stored.

As to general information that may be stored in the field, common frame IDs (identifiers) that indicate respective information are predefined as illustrated in FIG. 8.

For example, a frame ID "TIT2" indicates that information concerning the title of an audio file is stored in the field of the frame. A frame ID "TPE1" indicates that information concerning the artist (performer) name of the musical piece is stored in the field of the frame. A frame ID "TPE2" indicates that information concerning a band, an orchestra, or an accompanist is stored in the field of the frame.

Similarly, frame IDs "TCOM," "TEXT," "TPUB," "TCOP," "TDRL," "TLAN," and "TLEN" indicate that information concerning, respectively, a composer, a lyricist (a document creator), a publisher, a copyright, a release time, a language, and a length are stored in the field of the frame.

Note that besides the predefined frame IDs and their corresponding information, it is possible to define a special frame ID and provide a special frame in the field of which is stored special information.

Referring back to FIG. 7, in the padding region, padding data for adjusting the size of the tag to the size specified in the header is stored. For example, in the case where an additional frame is expected to be added later, it is possible to define, in the header, the size of the tag such that a region is secured for the additional frame and treat that region as the padding region until the additional frame is added.

In the footer, an identifier, a version of the ID3 tag, a flag that indicates, e.g., whether the extended header is present or not, and information concerning the size of the ID3 tag are stored. The footer is 10 bytes long. The footer is provided to increase the speed of a process of detecting the location of the ID3 tag, and the information stored therein is identical to that stored in the header except for the identifier.

In the MP3 file, the ID3 tag having the above structure is followed by the actual data (i.e., the audio data), which has been MPEG encoded.

A first content recommendation process of recommending, to the user who likes a predetermined content, another optimum content using the MP3 file having added thereto the ID3 tag in the above-described format will now be described below.

Figure 9:
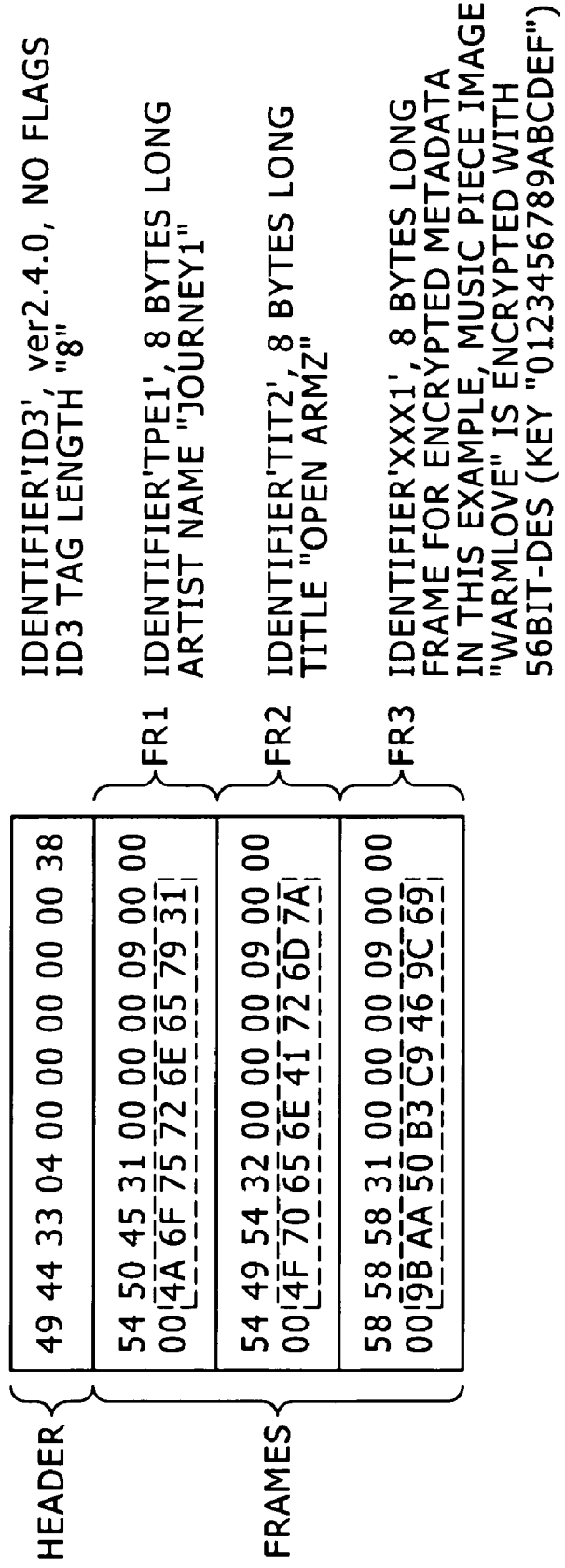
FIG. 9 is a diagram for explaining a first content recommendation process.

FIG. 9 illustrates exemplary data of the ID3 tag contained in the content data 41 supplied from the content distribution server 14. Note that, as will be described below, FIG. 9 refers to a case where "XXX" (i.e., the title of the musical piece) is "Open Armz."

As illustrated in FIG. 9, the ID3 tag of the content data 41 includes a header and frames. That is, in the example of FIG. 9, the extended header, the padding region, and the footer are omitted.

As shown in the figure, three frames FR1 to FR3 are arranged. The above-described first metadata is stored in the frames FR1 and FR2, while the above-described second metadata in an encrypted state is stored in the frame FR3.

The header (i.e., the ID3 header) of the content data 41 describes "49 44 33 04 00 00 00 00 00 38," and stores an identifier "ID3 " that identifies the ID3 tag, a version (Ver) "2.4.0,""No" flags, and an ID3 tag length "8."

The frame FR1, which follows the header, stores at least an identifier (a frame ID) "TPE1" that indicates a frame in which the information concerning the artist name of the actual data 41c is stored and an artist name "Journey1." Here, "Journey1" is represented by 8-byte text data "4A 6F 75 72 6E 65 79 31" enclosed by a dotted line within the frame FR1.

The frame FR2, which follows the frame FR1, stores at least an identifier "TIT2" that indicates a frame in which the information concerning the title of the actual data 41c is stored and a title "Open Armz." Here, "Open Armz" is represented by 8-byte text data "4F 70 65 6E 41 72 6D 7A" enclosed by a dotted line within the frame FR2.

The frame FR3, which follows the frame FR2, is a special frame defined by the content distributor. Specifically, the frame FR3 stores at least an identifier "XXX1" that indicates a special frame in which information that expresses an impression (an image) of the actual data 41c (i.e., the musical piece) is stored and text data "9B AA 50 B3 C9 46 9C 69" obtained by encrypting a musical piece impression "Warm-Love" using the encryption key 42a "0123456789ABCDEF" according to a 56bit-DES (Data Encryption Standard) encryption system, for example. This musical piece impression presented as the second metadata is a result of high-precision analysis performed by the content distribution server 14, and this enables the PD 11 to search for another musical piece that produces a similar impression with high precision.

If the PD 11 has acquired the content data 41, i.e., the MP3 file having added thereto the ID3 tag illustrated in FIG. 9, the PD 11 is naturally able to reproduce the actual data 41c thereof and display the artist name "Journey1" and the title "Open Armz" on the display section 76. In addition, the PD 11 is able to decrypt the encrypted second metadata "9B AA 50 B3 C9 46 9C 69" using the decryption key 42b and, based on resulting "WarmLove" that expresses the impression of the musical piece "Open Armz," search the storage section 78 for another optimum content to recommend it to the user, who may like the musical piece "Open Armz."

On the other hand, if the PD 12 has acquired the content data 41, i.e., the MP3 file having added thereto the ID3 tag illustrated in FIG. 9, the PD 12 is able to reproduce the actual data 41c thereof and display the artist name "Journey1" and the title "Open Armz" on the display section 76 but unable to recommend another optimum content to the user, who may like the musical piece "Open Armz."

To put it the other way round, the above-described special frame enables the PD 11 to perform the function of recommending another content which the user is supposed to like in addition to the function of reproducing the actual data 41c, but this does not involve preventing the PD 12, which does not have the function of providing the supplementary service, from performing its regular function of reproducing the content. In other words, it is possible to provide, only to a specific PD, the supplementary service using the second metadata.

Next, a second content recommendation process, which is different from the first content recommendation process, will now be described below. In the second content recommendation process, data stored in the special frame within the ID3 tag is different from that of the first content recommendation process.

Specifically, in the above-described first content recommendation process, the (encrypted) information that expresses the musical piece impression (image) is stored as the second metadata in the special frame within the ID3 tag, but in the second content recommendation process, information concerning the musical piece written in an ontology language OWL is stored therein.

The ontology language OWL is a language that has adopted a description logic that describes knowledge, relationships, etc., using mathematical logical relationships and is primarily used in the field of artificial intelligence. In the ontology language OWL (i.e., the description logic), it is possible to describe a variety of relationships between data, such as inheritance relationships, constraints, etc., and constructing a complicated architecture using the ontology language OWL enables sophisticated reasoning. Here, taking genres as an example of information concerning musical pieces, an exemplary description in the ontology language OWL using the inheritance relationships will now be described below.

In the second content recommendation process, basic information concerning genres of musical pieces written in the ontology language OWL as illustrated in FIG. 10 has previously been stored in the PD 11, which is to reproduce the content. Based on the basic information illustrated in FIG. 10, the content-related process section 75 of the PD 11 analyzes the information concerning the genres of musical pieces supplied as the special frame within the ID3 tag, and recommends a content.

Note that, in FIG. 10, line numbers outside a rectangular frame are provided to facilitate explanation and are not contained in the data actually stored in the PD 11. Also note that characters that follow "#" on each line (i.e., characters on the right hand side of each line) in FIG. 10 are treated as a comment and do not affect execution of the program. This is also true with FIG. 12, which will be described later.

On lines 2 to 12 in FIG. 10, class definitions are described.

Specifically, "mc:music a rdfs:Class" on line 2 indicates the definition of a music class. Properties of a genre are defined on lines 3 to 5: "mc:genreOf a rdfs:Property;" on line 3 represents that the properties of the genre will be defined; "rdfs:domain mc:music;" on line 4 represents that the genre belongs to the music class; and "rdfs:type gc:genre." on line 5 represents that the genre has an instance of a genre class.

On lines 7 to 12, the definition of the genre class is described. On line 7, "gc:genre a rdfs:Class." indicates the definition of the genre class. On line 8, "gc:jazz rdfs:subClassOf gc:genre." represents that a jazz class belongs to the genre class. On line 9, "gc:latin rdfs:subClassOf gc:genre." represents that a latin class belongs to the genre class. On line 10, "gc:modernjazz rdfs:subClassOf gc:jazz." represents that a modernJazz class belongs to the jazz class. On line 11, "gc:bossaNova rdfs:subClassOf gc:jazz." represents that a bossaNova class belongs to the jazz class. On line 12, "rdfs:subClassOf gc:latin." represents that the bossaNova class belongs to the latin class as well.

On lines 15 to 17, the definitions of genre instances are described.

Specifically, on line 15, "gi:Jazz a gc:jazz." defines a genre instance indicating a jazz (i.e., standard jazz) genre. On line 16, "gi:ModernJazz a gc:modernJazz." defines a genre instance indicating a ModernJazz genre. On line 17, "gi:BossaNova a gc:bossaNova." defines a genre instance indicating a BossaNova genre.

Such basic information concerning the genres of musical pieces written in the ontology language OWL is stored in the PD 11, and the content-related process section 75 analyzes this information, so that the content-related process section 75 constructs inheritance relationships (an concept) concerning the genres as illustrated in FIG. 11.

Data (i.e., information) indicating a genre to which the content belongs, as exemplified by each of lines 2 to 4 in FIG. 12, is encrypted and stored as the second metadata in the special frame within the ID3 tag of the content data 41.

For example, in the case where the musical piece "XXX" is "AAAXXX," ":AAAXXX a m:music; m:genreof gi:Jazz." described on line 2 in FIG. 12 is encrypted with the encryption key 42a and stored as the second metadata in the special frame within the ID3 tag of the content data 41. Accordingly, analysis by the content-related process section 75 finds that the musical piece "AAAXXX" is a musical piece that belongs to the jazz genre.

Also, in the case where the musical piece "XXX" is a musical piece "BBBYYY," ":BBBYYY a m:music; m:genreof gi:BossaNova." described on line 3 in FIG. 12 is encrypted with the encryption key 42a and stored as the second metadata in the special frame within the ID3 tag of the content data 41. In this case, analysis by the content-related process section 75 finds that the musical piece "BBBYYY" is a musical piece that belongs to the BossaNova genre. Similarly, in the case where the musical piece "XXX" is a musical piece "CCCZZZ," ":CCCZZZ a m:music; m:genreOf gi:ModernJazz." described on line 4 in FIG. 12 is encrypted with the encryption key 42a and stored as the second metadata in the special frame within the ID3 tag of the content data 41. In this case, analysis by the content-related process section 75 finds that the musical piece "CCCZZZ" is a musical piece that belongs to the ModernJazz genre.

Then, in the case where the musical piece "CCCZZZ" has been reproduced in the PD 11, for example, the content-related process section 75 of the PD 11 infers that if the user likes the musical piece "CCCZZZ" belonging to the ModernJazz genre, he or she will also like the musical piece "AAAXXX" belonging to the Jazz (i.e., the standard jazz) genre with high probability although it is not apparent that he or she will also like the musical piece "BBBYYY" belonging to the BossaNova genre, i.e., a genre dissimilar to that of modern jazz, thus recommending the musical piece "AAAXXX."

Also, in the case where the musical piece "AAAXXX " has been reproduced in the PD 11, for example, the content-related process section 75 of the PD 11 infers that if the user likes the musical piece "AAAXXX" belonging to the Jazz genre, he or she will also like, with high probability, the musical piece "CCCZZZ" belonging to the ModernJazz genre and the musical piece "BBBYYY" belonging to the BossaNova genre because both genres are subsumed under the Jazz genre, thus recommending the musical piece "CCCZZZ" and the musical piece "BBBYYY."

As described above, by encrypting the information concerning the genre of the content written in the ontology language OWL and providing the encrypted information as the second metadata in a frame (i.e., a special frame) within the ID3 tag, it becomes possible to provide a service of high-precision content recommendation to the PD 11 (i.e., the user of the PD 11) having the decryption key 42b. In other words, it becomes possible to provide the supplementary service employing the second metadata only to a specific PD.

Next, with reference to a flowchart illustrated in FIG. 13, a content data transmission process performed by the content distribution server 14 will now be described below. This process is started when a request for connection has been sent from a predetermined terminal via the network 13, for example. Note that in FIG. 13, the content transmission process performed by the content distribution server 14 is described with reference to an exemplary case where the PD 11 issues a request for connection to the content distribution server 14 in order to download the musical piece "XXX." (i.e., the content data thereof)

First, at step S11, the authentication processor 62 performs the authentication process in connection with the PD 11, which has accessed the content distribution server 14, via the communication section 61. Specifically, the authentication processor 62 checks whether or not the user of the PD 11 is a registered user, whether or not he or she is a supplementary service member, etc.

When the authentication process has been completed in connection with the PD 11, the content data generator 65 acquires, from the storage section 66, the first and second metadata 41a and 41b and the actual data 41c of the musical piece "XXX" requested from the PD 11 at step S12. The content data generator 65 also supplies the acquired second metadata to the encryption processor 64 and requests the encryption processor 64 to encrypt the second metadata.

At step S13, the cryptographic key generator 63 generates the pair of the encryption key 42a and the decryption key 42b used for encrypting and decrypting the second metadata 41b. The encryption key 42a and the decryption key 42b generated are stored in the storage section 66.

At step S14, the encryption processor 64 encrypts the second metadata 41b of the musical piece "XXX" supplied from the content data generator 65 using the encryption key 42a and supplies the encrypted second metadata 41b to the content data generator 65.

At step S15, the content data generator 65 generates the content data 41 in the form of a MP3 file from the first metadata 41a, second metadata 41b encrypted with the encryption key 42a, and actual data 41c of the musical piece "XXX."

At step S16, the communication section 61 transmits the decryption key 42b and the content data 41 supplied from the content data generator 65 to the PD 11 via the network 13 and finishes the process.

Figure 13:
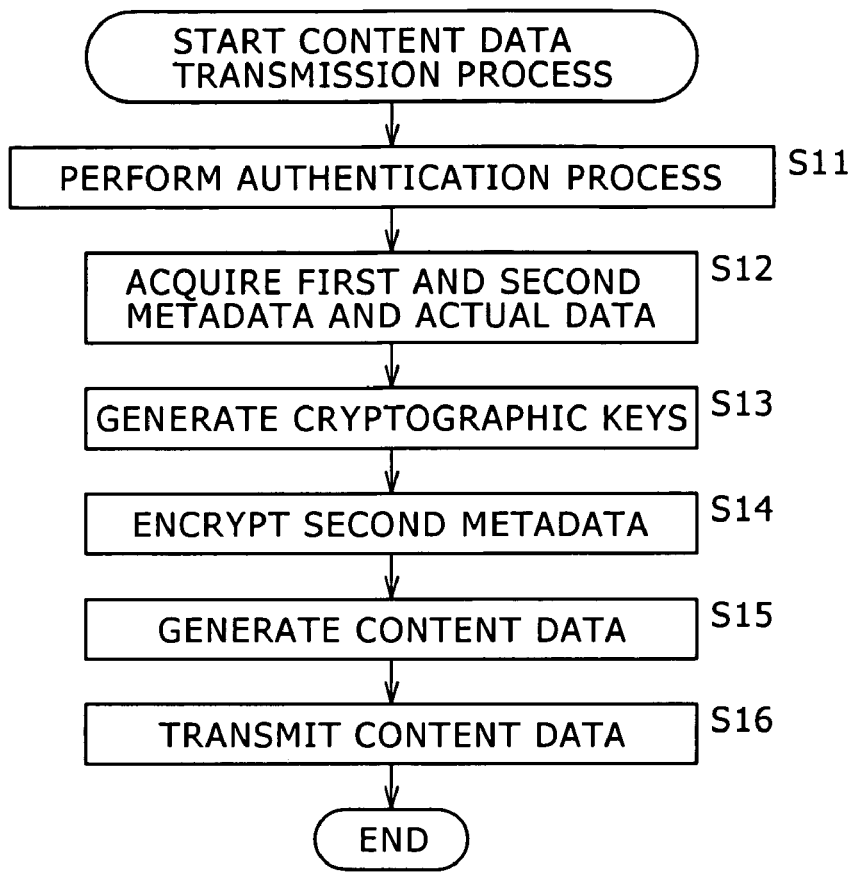
FIG. 13 is a flowchart for explaining a content data transmission process.
Figure 14:
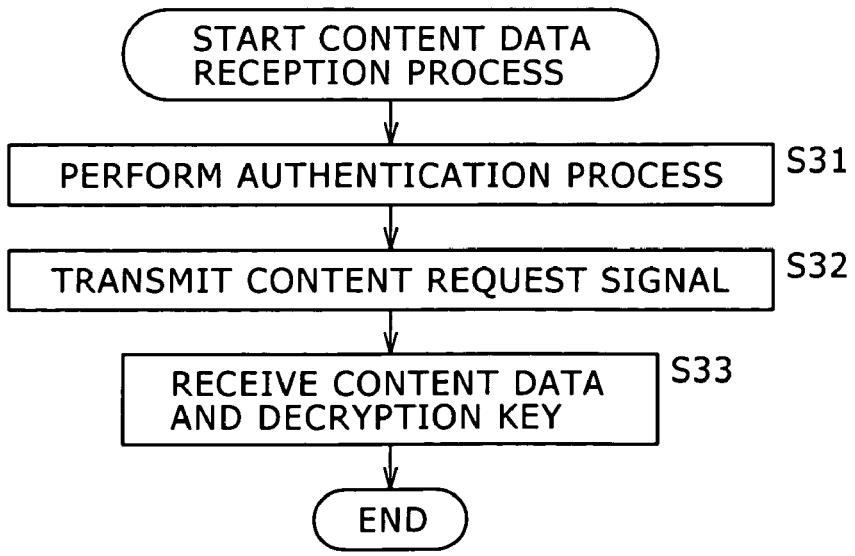
FIG. 14 is a flowchart for explaining a content data reception process.

FIG. 14 is a flowchart illustrating a content data reception process performed by the PD 11 in response to the content data transmission process of FIG. 13.

If the user operates the operation section 77 so as to access the content distribution server 14, the authentication processor 72 accesses the content distribution server 14 via the communication section 71 and performs the authentication process at step S31.

After the authentication process, information concerning a list of downloadable contents is transmitted from the content distribution server 14, and the list is displayed on the display section 76. The user specifies his or her desired content (i.e., the musical piece "XXX") from list of contents displayed on the display section 76, and operates the operation section 77 so as to issue an instruction to download it.

Then, at step S32, the operation section 77 supplies a signal for requesting the specified content to the communication section 71. Also at step S32, the communication section 71 transmits the content request signal to the content distribution server 14 via the network 13.

At step S33, the communication section 71 receives the content data 41 of the musical piece "XXX" and the decryption key 42b transmitted from the content distribution server 14 in response to the content request signal. Then, the content data 41 of the musical piece "XXX" and the decryption key 42b received are stored in the storage section 78, and the process is finished.

In the above-described manner, the PD 11 (i.e., the communication section 71 thereof) acquires the content data 41 in the form of the MP3 file in which the encrypted second metadata 41b is stored in a frame (a metadata region) within the ID3 tag and the decryption key 42b (i.e., decryption information) for decrypting the encrypted second metadata 41b.

Note that the decryption key 42b may not necessarily be transmitted from the content distribution server 14 to the PD 11. Instead, it may be so arranged that the decryption key 42b is previously stored in the PD 11 in such a state that it is unusable as it is and information (decryption information) that makes the decryption key 42b usable is transmitted to the PD 11. In this case, the PD 11 receives the content data 41 of the musical piece "XXX" and the decryption information, uses the decryption information to make the decryption key 42b usable, and decrypts the encrypted second metadata 41b.

Figure 15:
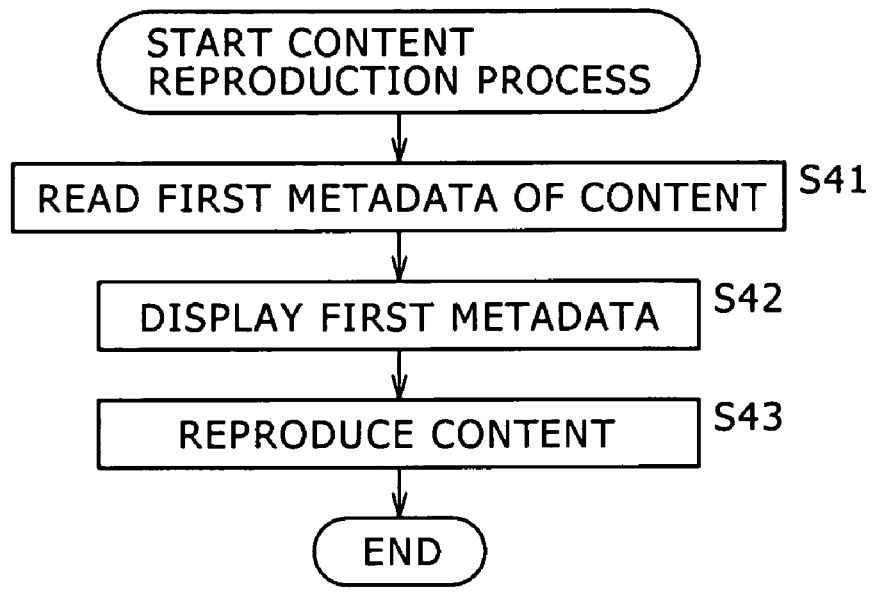
FIG. 15 is a flowchart for explaining a content reproduction process.

Next, a content reproduction process will now be described with reference to a flowchart illustrated in FIG. 15. The content reproduction process is started when the operation section 77 of the PD 11 has been operated so as to specify the musical piece "XXX" as the content and reproduce the content.

First, at step S41, the content reproduction section 73 acquires the content data 41 of the musical piece "XXX" from the storage section 78 and, in addition, reads the first metadata 41a stored in the content data 41 and supplies it to the display section 76.

At step S42, the display section 76 displays the first metadata 41a supplied from the content reproduction section 73. As a result, the title, artist name, etc., of the musical piece "XXX" are displayed on the display section 76.

At step S43, the content reproduction section 73 reproduces the content. Specifically, the content reproduction section 73 decodes the MPEG-encoded actual data 41c of the musical piece "XXX" to output music (i.e., sound) via the loudspeaker, the headphones, or the like, and the process is finished.

Figure 16:
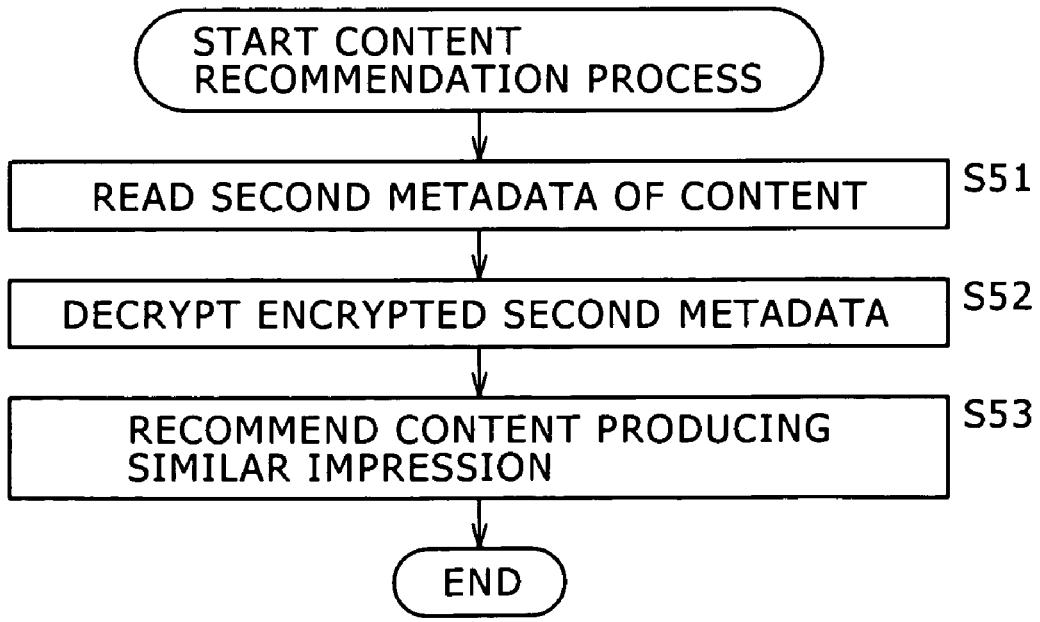
FIG. 16 is a flowchart for explaining a content recommendation process.

Next, with reference to a flowchart illustrated in FIG. 16, the content recommendation process (i.e., the first content recommendation process) of, in the case where the musical piece "XXX" has been specified as the content, recommending, to the user who likes that content, another optimum content will now be described below. This process may be performed when the musical piece "XXX" is reproduced, i.e., directly after the content reproduction process of FIG. 15, or alternatively may be performed independently of the content reproduction process of FIG. 15.

First, at step S51, the content-related process section 75 reads the encrypted second metadata 41b from the content data 41 of the specified content. Then, the content-related process section 75 supplies the encrypted second metadata 41b to the decryption processor 74 and requests the decryption thereof.

At step S52, the decryption processor 74 decrypts the encrypted second metadata 41b supplied from the content-related process section 75 and supplies the decrypted second metadata 41b to the content-related process section 75.

At step S53, based on the second metadata 41b, the content-related process section 75 recommends another content producing an impression similar to that of the specified content. Specifically, in the case where "WarmLove" expressing the impression of the musical piece "XXX" is stored as the second metadata 41b, another content producing an impression similar to "WarmLove" out of the contents stored in the storage section 78 is recommended (i.e., displayed on the display section 76), and the process is finished.

Note that, in the case where the recommendation process performed by the content-related process section 75 is the above-described second content recommendation process, at step S53, the content-related process section 75 recommends, based on the genre of the musical piece "XXX" stored as the second metadata 41b, another content belonging to a genre that the user is inferred to like.

As described above, by storing the encrypted second metadata 41b in a frame within the ID3 tag of the MP3 file, it becomes possible to allow a specific PD (i.e., the PD 11, whose user has paid the supplementary service fee) to carry out the supplementary service without interfering with the regular function of reproducing the content. The user is able to enjoy the supplementary service.

Thus, the content distributor is able to distinguish itself from the competition, which contributes to an increase in customers as users will come to desire to become supplementary service members who are able to enjoy the supplementary service. It also promotes purchase of contents through legal channels and serves to prevent illegal copying of the contents.

Note that in the above-described examples, the content-related process using the second metadata is the content recommendation process of recommending, to the user who likes the content specified (i.e., reproduced), another optimum content. However, the content-related process is not limited to the content recommendation process but may be other processes. In this case, data necessary for the content-related process to be performed is encrypted and stored as necessary in a frame within the ID3 tag.

Also note that in the above-described examples, the special frame is provided within the ID3 tag, and the second metadata used for the supplementary service is stored in the special frame. However, the second metadata may be stored in an extended tag of the ID3 tag, instead.

Also note that in the above-described examples, the ID3 tag is adopted as a format for storing the second metadata. However, the ID3 tag may not necessarily be adopted, but the present invention is applicable to any format that has at least a metadata region in which metadata is stored. Also note that the present invention is not limited to audio but naturally applicable also to an image (video data), etc.

The apparatus that executes the above-described content-related process is not limited to portable reproducing apparatuses such as PDs, but may be a personal computer, a hard disk recorder, a digital versatile disc (DVD) recorder, etc.

Note that in the present specification, the steps described in the flowcharts may naturally be performed chronologically in order of description but may not necessarily be performed chronologically. Some processes may be performed in parallel or independently.

Also note that in the present specification, the term "system" as used in "content distribution system" refers to a group of devices forming a network to serve a common purpose.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus that processes content data supplied in a format that has at least a metadata region in which metadata of a content is stored, the apparatus comprising:
    acquisition means for acquiring the content data in said format, the content data containing the content and encrypted metadata stored in the metadata region, and for acquiring decryption information for decrypting the encrypted metadata in response to a determination that the apparatus, in connection with a source that supplies the content data, is a member of a supplementary service, the encrypted metadata being encrypted apart from the content;
    decryption means for decrypting the encrypted metadata stored in the metadata region using the decryption information when the decryption information is acquired and the content is selected or reproduced; and
    supplementary service providing means for providing the supplementary service by recommending another content based on similarities between metadata of the another content and the metadata decrypted by said decryption means, wherein
    the decrypted metadata is either data representing a genre of the content or data expressing an impression of the content, and
    the content data contains the content and the encrypted metadata stored in the metadata region as a single file.

2. The information processing apparatus according to claim 1, the apparatus further comprising:
    authentication means for performing an authentication process in connection with a server that supplies the content data to determine whether the apparatus is a member of the supplementary service, wherein
    said acquisition means acquires the decryption information by receiving the decryption information from the server, separate from the content data, after the authentication process is completed.

3. The information processing apparatus according to claim 1, wherein, said format is a MP3 (MPEG (Moving Picture Experts Group)-1 Audio Layer-3), and the metadata region is an extended tag or a frame within an ID3 tag.

4. The information processing apparatus according to claim 1, wherein the metadata is written in a language that has adopted a description logic.

5. The information processing apparatus according to claim 4, wherein the language is an ontology language OWL.

6. The information processing apparatus according to claim 1, wherein,
    the content is audio data or video data, and
    the information processing apparatus is a reproducing apparatus that reproduces the content.

7. The information processing apparatus according to claim 1, wherein the content is unencrypted in the content data.

8. The information processing apparatus according to claim 1, wherein
    the content data includes an unencrypted metadata which includes information other than information included in the encrypted metadata, and
    in response to a determination that the apparatus, in connection with the source that supplies the content data, is not a member of the supplementary service, the encrypted metadata remains encrypted while the unencrypted metadata and the content are accessible for selection or playback.

9. An information processing method employed by an information processing apparatus that processes content data supplied in a format that has at least a metadata region in which metadata of a content is stored, the method comprising:

acquiring the content data in said format, the content data containing the content and encrypted metadata stored in the metadata region;

acquiring decryption information for decrypting the encrypted metadata in response to a determination that the apparatus, in connection with a source that supplies the content data, is a member of a supplementary service, the encrypted metadata being encrypted apart from the content;

decrypting the encrypted metadata stored in the metadata region using the decryption information when the decryption information is acquired and the content is selected or reproduced; and providing the supplementary service by recommending another content based on similarities between metadata of the another content and the decrypted metadata, wherein the decrypted metadata is either data representing a genre of the content or data expressing an impression of the content, and the content data contains the content and the encrypted metadata stored in the metadata region as a single file.

10. The method according to claim 9, wherein the content is unencrypted in the content data.

11. A non-transitory storage medium storing instructions that when executed by a processor causes processing of content data supplied in a format that has at least a metadata region in which metadata of a content is stored according to a method, the method comprising:

acquiring the content data in said format, the content data containing the content and encrypted metadata stored in the metadata region;

acquiring decryption information for decrypting the encrypted metadata in response to a determination that the apparatus, in connection with a source that supplies the content data, is a member of a supplementary service, the encrypted metadata being encrypted apart from the content;

decrypting the encrypted metadata stored in the metadata region using the decryption information when the decryption information is acquired and the content is selected or reproduced; and providing the supplementary service by recommending another content based on similarities between metadata of the another content and the decrypted metadata, wherein the decrypted metadata is either data representing a genre of the content or data expressing an impression of the content, and the content data contains the content and the encrypted metadata stored in the metadata region as a single file.

12. The storage medium according to claim 11, wherein the content is unencrypted in the content data.

13. An information processing apparatus that processes content data supplied in a format that has at least a metadata region in which metadata of a content is stored, the apparatus comprising:

an acquisition unit configured to acquire the content data in said format, the content data containing the content and encrypted metadata stored in the metadata region, the acquisition unit further configured to acquire decryption information to decrypt the encrypted metadata in response to a determination that the apparatus, in connection with a source that supplies the content data, is a member of a supplementary service, the encrypted metadata being encrypted apart from the content;

a decryptor configured to decrypt the encrypted metadata stored in the metadata region using the decryption information when the decryption information is acquired and the content is selected or reproduced; and a supplementary service providing unit configured to provide the supplementary service based on similarities between metadata of the another content and the metadata decrypted by said decryptor, wherein the metadata decrypted by said decryptor is either data representing a genre of the content or data expressing an impression of the content, and the content data contains the content and the encrypted metadata stored in the metadata region as a single file.

14. The information processing apparatus according to claim 13, wherein the content is unencrypted in the content data.

* * * * *